United States Patent [19]
Still

[11] Patent Number: 5,960,917
[45] Date of Patent: Oct. 5, 1999

[54] GROUPED SPRAGS

[75] Inventor: Gerhard Still, Schoenbrunn, Germany

[73] Assignee: Dana Corporation, Toledo, Ohio

[21] Appl. No.: 08/891,426

[22] Filed: Jul. 17, 1997

[51] Int. Cl.[6] .................................................. F16D 41/07
[52] U.S. Cl. ................. 192/45.1; 192/103 B; 192/109 R
[58] Field of Search ................................. 192/45.1, 41 A, 192/103 B, 104 B, 104 C, 109 R, 72; 188/82.8

[56] References Cited

U.S. PATENT DOCUMENTS

| | | | |
|---|---|---|---|
| 1,694,377 | 12/1928 | De Lavaud . | |
| 2,561,600 | 7/1951 | Szady | 192/45.1 |
| 2,803,324 | 8/1957 | Dodge | 192/45.1 |
| 3,036,678 | 5/1962 | Dodge | 192/45.1 |
| 3,545,581 | 12/1970 | Kent | 192/104 B X |
| 3,844,391 | 10/1974 | Hallerberg | 192/41 A |
| 3,997,041 | 12/1976 | Judd et al. . | |
| 5,445,255 | 8/1995 | Rutke et al. | 192/45.1 |
| 5,469,949 | 11/1995 | Leitz | 192/45.1 |
| 5,482,144 | 1/1996 | Vranish | 188/6 |
| 5,518,094 | 5/1996 | Myrick | 192/45.1 |
| 5,524,742 | 6/1996 | Pratt | 192/45.1 |

FOREIGN PATENT DOCUMENTS

| | | |
|---|---|---|
| 1144065 | 2/1963 | Germany . |
| 2014056 | 10/1971 | Germany . |
| 2632072 | 1/1978 | Germany . |

OTHER PUBLICATIONS

European Search Report Application No. EP 98 30 5010 Dated: Oct. 16, 1998.

*Primary Examiner*—Richard M. Lorence
*Attorney, Agent, or Firm*—Rader, Fishman & Grauer PLLC

[57] ABSTRACT

A one-way sprag clutch is disclosed. The clutch includes coaxial inner and outer races. A plurality of sprags arranged in a group is located within a cage between the races. The sprags are engageable with the inner surface and the outer surface by rotating in a first peripheral direction relative of the surfaces to transmit a torque between the two races. A plurality of bolts is located adjacent to the sprag group. The number of sprags in the group is greater than the number of bolts. In particular, one of the bolts limits rotation of the sprags in a first direction beyond an engaged position and a second bolt limits rotation of the sprags in a second direction to a lift-off position.

21 Claims, 4 Drawing Sheets

GROUPED SPRAGS

SUMMARY OF THE INVENTION

This invention relates to centrifugal liftoff sprag clutches. More particularly, this invention relates to one-way clutches having groups of sprags disposed in a cage between concentric races for controlling torque delivery in a torque flow path between a driving member and a driven member.

BACKGROUND OF THE INVENTION

Sprag clutches which use a centrifugal liftoff action to effect liftoff of the sprags from either an inner race or an outer race are known. The sprags are biased into engagement with both races to effect a wedging action preventing rotation of the races relative to each other in a first direction. Relative rotation of the races in a second direction, called overrunning, is permitted. At a certain relative angular velocity in the second direction, the centrifugal force acting on the sprags due to an asymmetric geometry of each sprag increases to a magnitude which causes the sprags to pivot about an axis of rotation such that a clearance develops between the sprags and the races. This clearance, or liftoff, removes the torque coupling between the races.

In conventional sprag type clutches, a plurality of sprags is disposed between the races within a cage which rotates together with either the inner race or with the outer race. Known cages include a plurality of aligned openings or windows spaced circumferentially around the cage. One sprag is rotatably mounted within each aligned opening to engage and disengage the concentric clutch races. The sprags rotate to engage and lock the clutch when moving in a first direction of rotation and rotate to disengage and allow overrunning of the clutch when moving in a second direction. To limit rotational motion of each sprag in the second direction to a lift-off position, the cage includes an axially extending cross member or bolt located adjacent each sprag in the portion of the cage between each circumferentially spaced window. In conventional arrangements, the cage includes one bolt for each sprag for limiting the rotational movement of the sprag when in a lift-off position or for holding the sprag in position while being mounted between the races.

SUMMARY OF THE INVENTION

The present invention relates to an improved one-way clutch which includes an outer race having an annular inner surface and an inner race having an annular outer surface. The inner race is disposed coaxially with the outer race. A sprag cage is mounted in the annular space between the races. A plurality of sprags arranged in an interacting group is located within the cage between the inner surface and the outer surface. The sprags are engageable with the inner surface and the outer surface by rotating in a first peripheral direction relative of the surfaces to an engaged position to transmit a torque between the two races. A plurality of bolts is located adjacent to the sprag group. The number of sprags in the group is greater than the number of bolts adjacent thereto. In particular, one of the bolts limits rotation of the sprags in the first direction to the engaged position, and a second bolt limits rotation of the sprags in a second direction to a lift-off position.

Because only one bolt is required for limiting rotation of the sprags to a lift-off position, less space is taken by bolts in the cage. As a result, more sprags may be placed circumferentially within the cage in the space between the inner and outer races. Because there is less space per sprag, the clutch transmits higher torque and has a longer clutch life. Additionally, because the present invention requires fewer bolts, fewer holes need be bored through the cage, leading to easier manufacture and assembly. The sprag cage of the present invention is applicable to centrifugal throw-out free wheel clutches where the driven race is either the inner race or the outer race. Therefore, the present invention presents one type of cage for two types of free wheel clutches.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE PREFERRED EMBODIMENT

Figure 1:
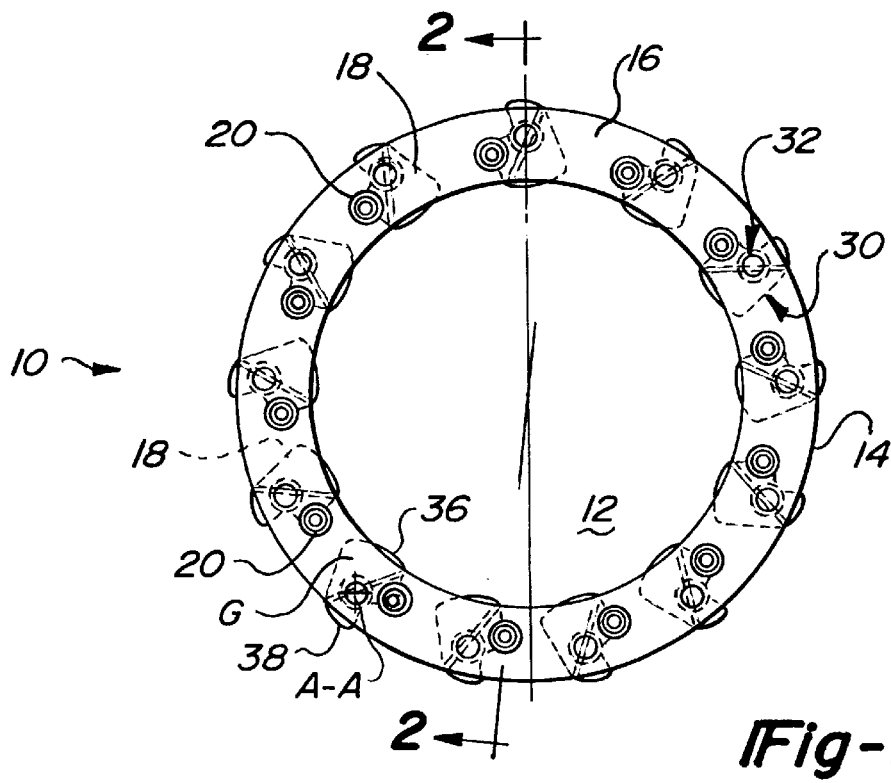
FIG. 1 is a cross-sectional view of a prior art sprag clutch.
Figure 2:
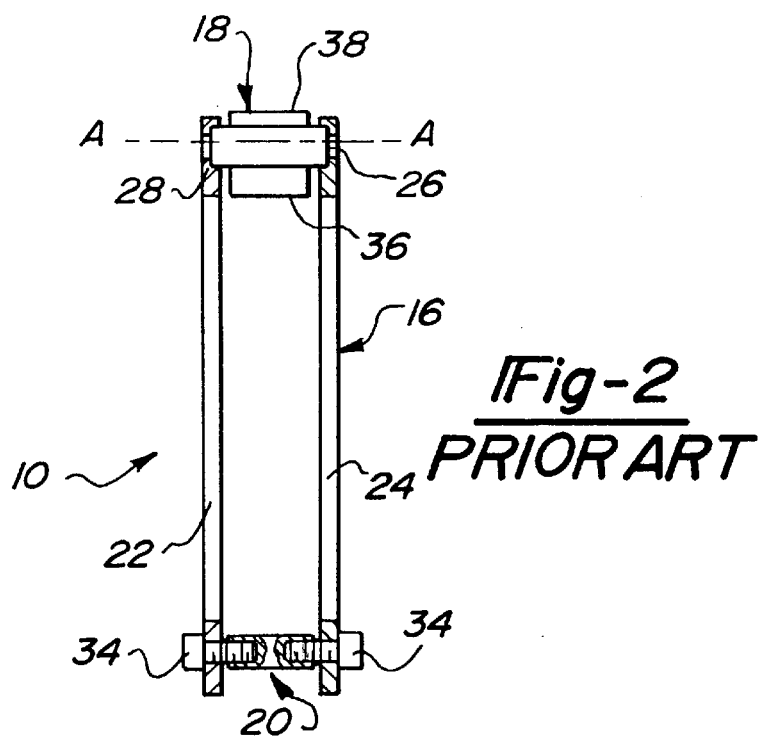
FIG. 2 is a cut away view of the prior art clutch of FIG. 1 taken along line 2—2.

A prior art sprag clutch 10 is illustrated with reference to FIGS. 1 and 2. Clutch 10 includes an inner race 12, an outer race 14 and a sprag cage 16. Cage 16 is located between inner and outer concentric race portions 12 and 14. Races 12 and 14 are substantially cylindrical and concentrically mounted. Each race 12, 14 is adapted to be respectively connected with an associated rotatable member (not shown). A plurality of torque engagement members or sprags 18 is disposed between the races 12, 14. Each sprag 18 is provided with a pair of concentric wedging surfaces for wedging against races 12, 14 as sprag 18 is rotated in a first direction into engagement with the races. Each sprag 18 has associated therewith a longitudinally extending member or bolt 20 which limits the rotation of sprag 18 in a second direction when sprag 18 is in a lift-off position while clutch 10 is overrunning. Cage 16 typically is formed from two parallel annular discs 22 and 24 oriented in a spaced relationship. Trunnions 26 extend laterally on either side of sprag 18 and are received in bores 28 of cage 16 to rotatably mount sprag 18 in cage 16. As is well known in the art, sprags 18 have arcuate race engaging surfaces 36 and 38, and are asymmetrically shaped. The geometry of sprag 18 provides for a circumferentially unbalanced mass as a result of a center of gravity G being spaced apart from the axis of rotation A—A.

Each sprag 18 includes a generally convex side 30 and a concave side 32, each of the sides extending radially between the races. As either race 12 or 14 overruns, sprag 18 rotates in a second direction to a lift-off position, removing surfaces 36 and 38 away from engaging the races, thereby removing the coupling engagement between inner race 12 and outer race 14. In order to limit the extent of rotation of sprag 18 in the second direction, bolt 20 is positioned to contact convex side 30 of sprag 18 when sprag 18 is in a lift-off position, thereby preventing further rotation of sprag 18 in the second direction. As shown in FIG. 2, bolt 20 may consist of an axially extending bar fastened with fasteners 34 to discs 22 and 24 of cage 16. FIG. 2 shows fasteners 34 as bolts; however, fasteners 34 could be rivets or other engaging devices, or bolt 20 may include integral fasteners. Thus, according to the prior art, one bolt or cross member 20 is required for each sprag 18 placed between inner race 12 and outer race 14.

Figure 3:
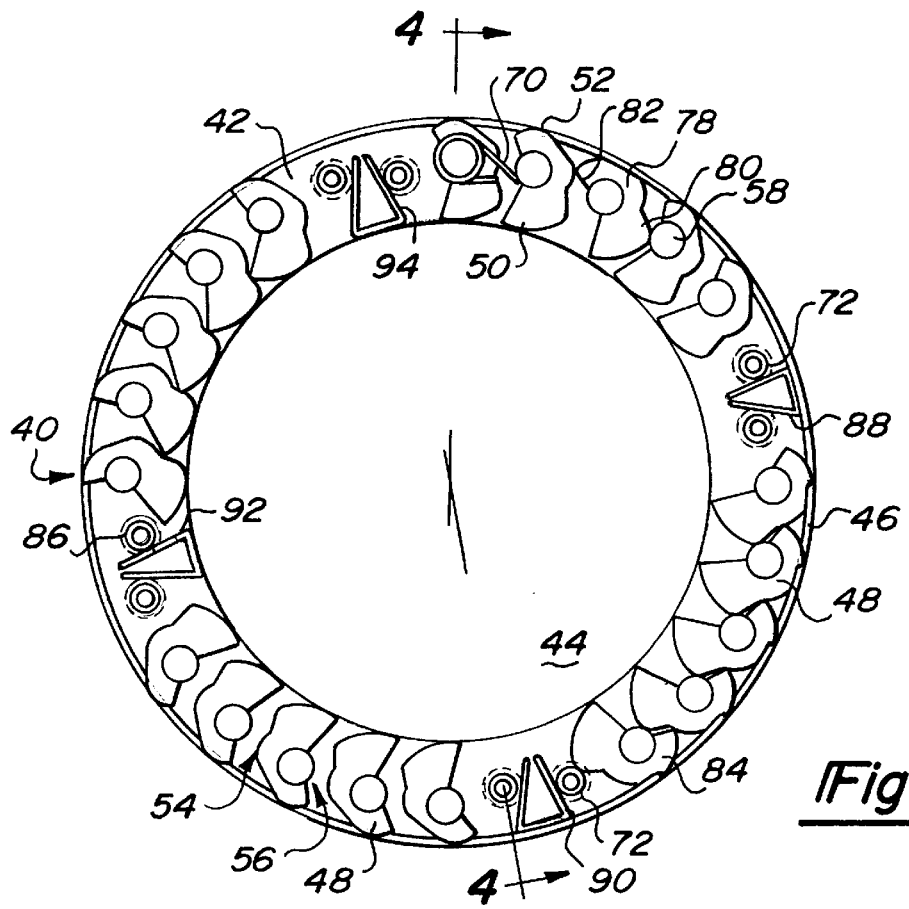
FIG. 3 is a cross-sectional view of the sprag clutch of the present invention.
Figure 4:
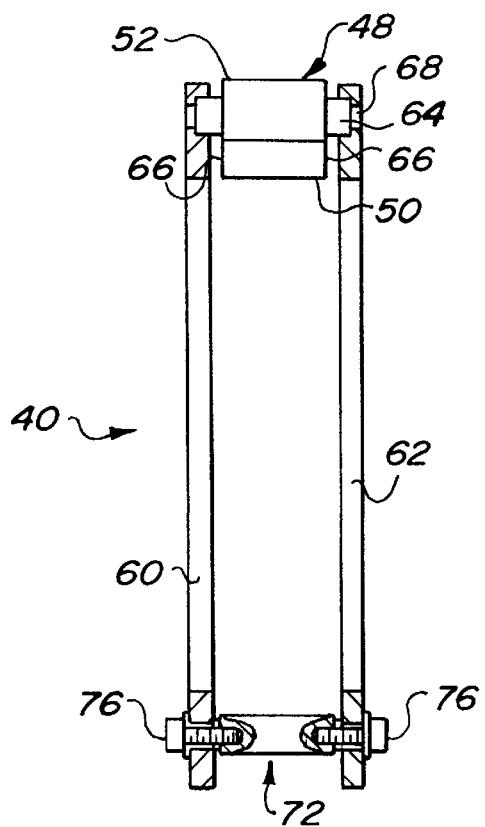
FIG. 4 is a cut away view of the sprag clutch of the present invention taken along line 4—4 of FIG. 3.
Figure 7:
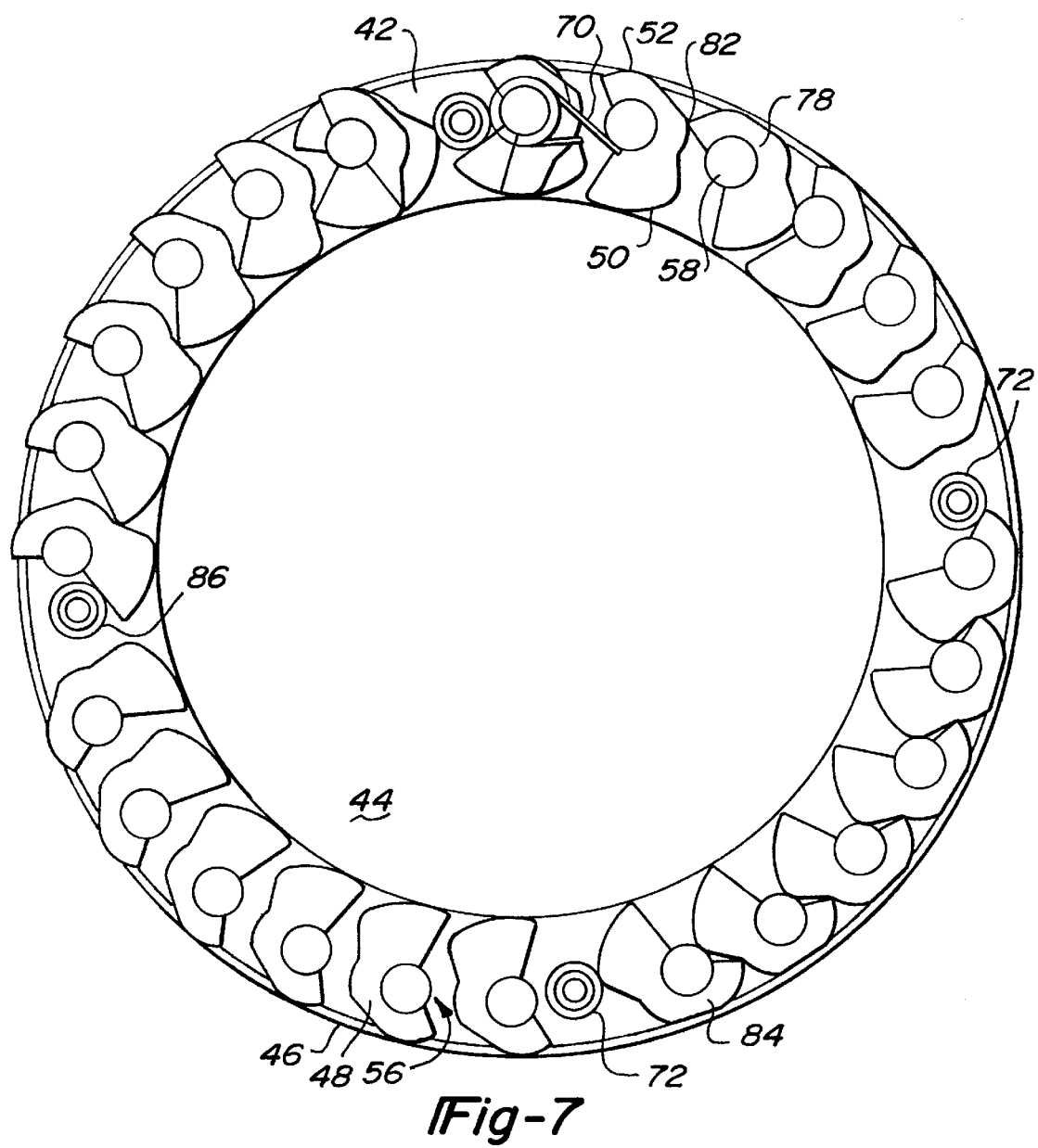
FIG. 7 is a cross-sectional view of a sprag clutch according to a modified embodiment.

Various embodiments of an overrunning clutch 40 are shown in FIGS. 3, 4 and 7. Clutch 40 includes a cage 42 placed between inner and outer concentric race portions 44 and 46. The races 44, 46 are substantially cylindrical and concentrically mounted. Each race 44, 46 is adapted to be respectively connected with an associated driving or driven rotatable member (not shown). A plurality of torque engagement members or sprags 48 is disposed between the races 44, 46 within cage 42. Each sprag 48 is provided with generally arcuate inner and outer engagement surfaces 50 and 52.

Figure 5:
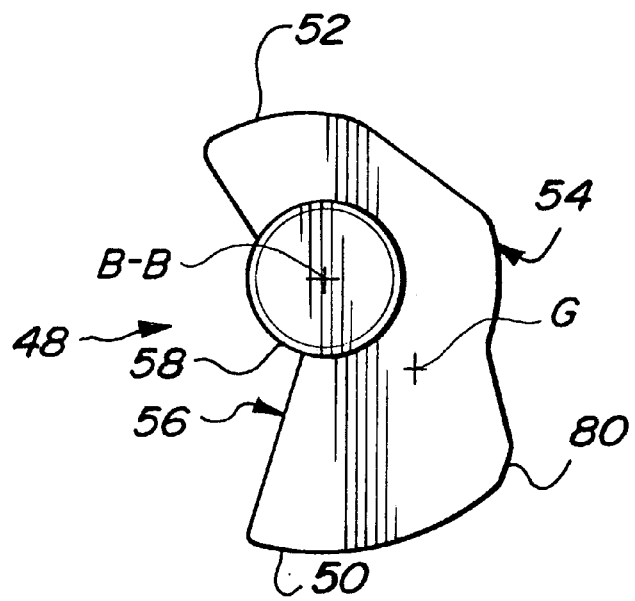
FIG. 5 is a cross sectional view of an individual sprag used in the present invention.
Figure 6:
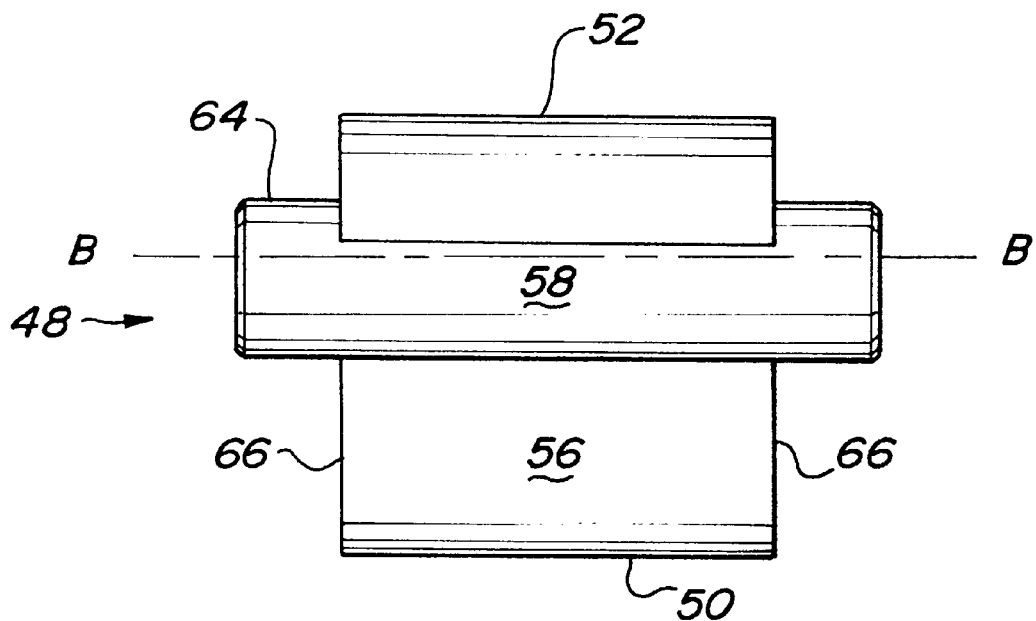
FIG. 6 is an axial view of the sprag of FIG. 5.

As best seen in FIGS. 5 and 6, sprags 48 have arcuate race-engaging surfaces 50 and 52 and are asymmetrically shaped. The geometry of sprag 48 provides for a circumferentially unbalanced mass as a result of a center of gravity G' being offset and spaced from an axis of rotation B—B. Each sprag 48 includes a generally convex side 54 and a generally concave side 56, each of the sides extending radially between the race-engaging surfaces 50 and 52. Concave side 56 further includes an axially extending cylindrical portion 58.

According to the present invention, sprags 48 are arranged between parallel cage discs 60 and 62 in a predetermined plurality of groups and sprags per group. For example in FIG. 3, four groups of five sprags each are shown. In FIG. 7, four groups of six sprags each are shown. In both FIGS. 3 and 7, each group of sprags demonstrates a different operational position for clutch 40, as indicated on the figures. Trunnions 64 extend from lateral sides 66 of sprags 48 and are received within bores 68 spaced in predetermined relationship along cage discs 60, 62. Each sprag 48 is resiliently biased in a first direction (clockwise in FIG. 3) to an engaged position by a biasing member such as spring 70 shown in FIG. 3. Although each sprag is coupled to a biasing member 70, only one such biasing member is shown in the figures. As either race 44 or 46 overruns, sprag 48 rotates in a second direction to a lift-off position, removing surfaces 50 and 52 away from engaging the races, thereby removing the coupling engagement between inner race 44 and outer race 46.

A plurality of axial cross members or bolts 72 are located adjacent each group of sprags 48. Bolts 72 are secured in FIG. 4 with threaded fasteners 76; however, fasteners 76 could be replaced with other fastening means such as rivets, a single threaded member, or the like.

As shown in FIG. 3, sprags 48 are divided into four groups of five sprags in each group, referenced as "Group 1" through "Group 4". Each group illustrates a different operational position for clutch 40. Group 1 illustrates sprags 48 in a generally engaged position. But the middle sprag 78 of Group 1 is disengaged from inner and outer races 44, 46. Sprag 78 of Group 1 is prevented from over-rotating in the second (counter clockwise) direction by interaction with adjacent sprags. A radially inner most portion 80 of convex side 54 contacts cylindrical portion 58 of an adjacent sprag, preventing excessive liftoff of sprag 78. Additionally, radially outermost portion 82 of generally concave side 56 on sprag 78 contacts convex side 54 of the sprag adjacent to the generally concave side of sprag 78. In this way, sprag 78 is prevented from over rotating in the second direction to a lift-off position while adjacent sprags of the same group are in an engaged position.

All five sprags of Group 2 of FIG. 3 are shown rotated in a second direction (counter clockwise) to a lift-off position. Each sprag of Group 2 cooperates with the adjacent sprag or sprags while in the lift-off position. A bolt 72 is positioned adjacent the last sprag 84 of Group 2 so that when sprag 84 rotates in the second direction to a lift-off position, the radially inner most portion 80 of convex side 54 of sprag 84 engages bolt 72, thereby preventing sprag 84 from overrotating. By interaction with adjacent sprags of Group 2, all sprags in Group 2 are prevented from over rotating in the second (counter clockwise) direction when in a lift-off position.

The sprags of Group 3 are shown in FIG. 3 in a normal engaged position. As an input drive is transmitted either counter clockwise from inner race 44 or clockwise from outer race 46, sprags 48 rotate in a first direction to engage both inner race 44 and outer race 46 in an engaged position, thereby transmitting torque between the races.

Additionally, the position of the sprags of Group 4 in FIG. 3 show the position of the sprags in the Group prior to and during assembly of clutch 40. Cage 42, including sprags 48, may be coupled to either inner race 44 or outer race 46, using coupling members such as spring clips 88, 90, 92 and 94 as shown in FIG. 3. Spring clips 88 and 90 are oriented to couple cage 42 to outer race 46 in a first embodiment, while clips 92 and 94 are oriented to couple cage 42 to inner race 44 in a second embodiment. Before cage 42 is coupled with either inner race 44 or outer race 46, cage 42 is assembled with sprag groups. Once assembled, biasing members attached to each sprag, such as spring 70, resiliently bias every sprag in the first direction (clockwise) to an engaged position. But when no race is present against which the sprags engage, the biasing member forces each sprag to rotate until the biasing member is unloaded. Once each sprag is allowed to unload the biasing members, it is difficult or impossible to rotate the sprags back to an engaged position after the cage is assembled between inner and outer races 44 and 46. Thus, a bolt is used to limit the amount that the sprags may rotate in the first direction prior to assembly between races 44 and 46. In Group 4 of FIG. 3, the position of bolt 86 adjacent the sprag group prevents the sprags of Group 4 from rotating to the point of unloading the biasing member attached to each sprag in the group.

In the arrangement shown in FIG. 7, only one bolt per sprag group is necessary to limit rotation in either a first or second direction, as against two bolts per group shown in FIG. 3. Sprag group positions in FIG. 7 correspond generally to the sprag group positions in FIG. 3. In FIG. 7, a bolt is located both in front of and behind each sprag group, thus preventing over-rotation in either the first or the second directions. The configuration shown in FIG. 7 thus provides four more sprags than the configuration of FIG. 3, resulting in less wear and greater torque transmission.

In all embodiments, at least one bolt is placed adjacent each sprag group. Preferably, one bolt is placed on either circumferential side of each group of sprags to limit sprag rotation in either the first or second direction. As a result of this configuration, fewer bolts are required on cage 42, allowing a higher density of sprags and a greater number of sprags within a given annular space between an inner and an outer race than conventional sprag clutches. Each sprag occupies less space on the cage between the races, resulting in more sprags occupying excess space. More sprags between the races allows more torque to be transmitted between input and output members, allowing application of this type of clutch to higher torque environments. Additionally, since more sprags take up the torque loading, clutch life is increased.

Further, grouping the sprags requires fewer bolts along the circumference of the cage. As a result, fewer holes are required for bolts, leading to easier and more cost-effective manufacture as well as easier assembly of the cage. The resulting cage, including grouped sprags, is configured to be coupled with either the inner race or the outer race for rotation therewith. Thus, one type of cage services two types of free wheel clutches: first, where the cage rotates together with the inner race; and second, where the cage is rotating together with the outer race. Manufacture of both types of free wheel clutches is therefore streamlined.

The disclosed embodiments and examples are given to illustrate the present invention. But they are not meant to limit the scope and spirit of the present invention. Therefore, the scope of the present invention should be considered by reviewing the appended claims.

What is claimed is:

1. A one-way clutch comprising:
   an outer race having an annular inner surface, an inner race having an annular outer surface and disposed coaxially with said outer race;
   a plurality of sprags arranged in a group and located between said inner surface and said outer surface, and engageable with said inner surface and said outer surface by rotating in a first peripheral direction relative of said surfaces to an engaged position for transmitting a torque between said two races, said sprags resiliently biased in said first direction;
   a sprag cage for holding said sprags in an annular space between said annular surfaces; and
   a plurality of bolts adjacent said grouped sprags, said plurality of sprags being greater than said plurality of bolts, one of said bolts limiting rotation of said sprags in a second direction to a lift-off position disengaged with said inner surface and said outer surface, a second of said bolts limiting the rotation of said sprags in said first direction.

2. A one-way clutch as in claim 1, wherein a biasing member provides bias in said first direction, said second bolt limiting rotation of said sprags beyond an unloading point of said biasing member.

3. A one-way clutch as in claim 2, wherein each of said sprags has a center of gravity offset from an axis of rotation.

4. A one-way clutch as in claim 3, wherein said sprag cage houses multiple sprag groups.

5. A one-way clutch as in claim 4, wherein the number of bolts equals the number of groups.

6. A one-way clutch as in claim 4, wherein said cage is coupled with said inner race.

7. A one-way clutch as in claim 4, wherein said cage is coupled with said outer race.

8. A one-way clutch as in claim 1, wherein said cage is coupled with said inner race.

9. A one-way clutch as in claim 1, wherein said cage is coupled with said outer race.

10. A centrifugal throw-out sprag clutch having a cage between concentric inner and outer races, comprising:
    a plurality of sprags arranged in a group within said cage, each said sprag including inner and outer surfaces for respectively engaging the inner and outer races when rotated in a first direction to an engaged position, said sprags resiliently biased in said first direction along an axis of rotation into said engaged position, said sprags rotating along said axis in a second direction opposite said first direction to a lift off position disengaged with said surfaces when subjected to centrifugal force; and
    a plurality of bolts adjacent said group, said plurality of sprags being greater than said plurality of bolts, a first of said bolts limiting rotation of said sprags in said second direction to said lift-off position, a second of said bolts limiting rotation in said first direction beyond said engaged position.

11. A centrifugal throwout sprag clutch as in claim 10, wherein each of said sprags has a center of gravity offset from said axis of rotation.

12. A centrifugal throwout sprag clutch as in claim 11, wherein said sprag cage houses multiple sprag groups.

13. A centrifugal throwout sprag clutch as in claim 12, wherein the number of groups equals the number of bolts.

14. A centrifugal throwout sprag clutch as in claim 12, wherein said cage is coupled with said inner race.

15. A centrifugal throwout sprag clutch as in claim 12, wherein said cage is coupled with said outer race.

16. A centrifugal throwout sprag clutch as in claim 10, wherein said cage is coupled with said outer race.

17. A centrifugal throwout sprag clutch as in claim 10, wherein said cage is coupled with said outer race.

18. A centrifugal throwout sprag clutch as in claim 12, wherein said sprag cage houses four sprag groups, each said sprag group including five sprags and defining a first and a second circumferential side, said first bolt located adjacent said first circumferential side and said second bolt located adjacent said second circumferential side.

19. A centrifugal throwout sprag clutch as in claim 12, wherein said sprag cage houses four sprag groups, each said sprag group including six sprags and defining a first and a second circumferential side, said first bolt located adjacent said first circumferential side and said second bolt located adjacent said second circumferential side.

20. A centrifugal throw-out sprag clutch having a cage between concentric inner and outer races, comprising:
    a plurality of asymmetrical sprags arranged in a group within said cage, each said sprag including inner and outer surfaces for respectively engaging the inner and outer races when rotated in a first direction to an engaged position, each sprag further including a generally convex side and a generally concave side radially extending between said inner and outer surfaces, said concave side further including an axially extending cylindrical portion, the center of said cylindrical portion being an axis of rotation for said sprag, said sprags resiliently biased in said first direction along said axis of rotation into said engaged position, said sprags rotating along said axis in a second direction opposite said first direction to a lift off position disengaged with said surfaces when subjected to centrifugal force; and
    a plurality of bolts adjacent said group, said plurality of sprags being greater than said plurality of bolts, a first of said bolts limiting rotation of said group of sprags in said second direction to said lift-off position, a second of said bolts limiting rotation of said group of sprags in said first direction beyond said engaged position.

21. A centrifugal throw-out sprag clutch as in claim 20, wherein all but one sprag in each group is prevented from over rotating in said second direction by a radially innermost portion of said convex side of a rotating sprag contacting said cylindrical portion of an adjacent sprag.

* * * * *

UNITED STATES PATENT AND TRADEMARK OFFICE
CERTIFICATE OF CORRECTION

PATENT NO. : 5,960,917
DATED : October 5, 1999
INVENTOR(S) : Gerhard Still

It is certified that error appears in the above-identified patent and that said Letters Patent is hereby corrected as shown below:

Col. 6, line 23
 replace "outer"
 with --inner--.

Signed and Sealed this

Twenty-third Day of May, 2000

Attest:

Q. TODD DICKINSON

*Attesting Officer*     *Director of Patents and Trademarks*